United States Patent
Wang et al.

(10) Patent No.: US 10,834,399 B2
(45) Date of Patent: Nov. 10, 2020

(54) PANORAMIC VIDEO COMPRESSION METHOD AND DEVICE

(71) Applicant: BEIJING QIYI CENTURY SCIENCE & TECHNOLOGY CO., LTD., Beijing (CN)

(72) Inventors: Tao Wang, Beijing (CN); Jiadan Zhu, Beijing (CN); Yao Du, Beijing (CN); Hongbin Liu, Beijing (CN)

(73) Assignee: BEIJING QIYI CENTURY SCIENCE & TECHNOLOGY CO. LTD., Beijing (CN)

( * ) Notice: Subject to any disclaimer, the term of this patent is extended or adjusted under 35 U.S.C. 154(b) by 0 days.

(21) Appl. No.: 16/320,409

(22) PCT Filed: Aug. 8, 2017

(86) PCT No.: PCT/CN2017/096432
§ 371 (c)(1),
(2) Date: Jan. 24, 2019

(87) PCT Pub. No.: WO2018/040860
PCT Pub. Date: Mar. 8, 2018

(65) Prior Publication Data
US 2019/0268595 A1    Aug. 29, 2019

(30) Foreign Application Priority Data

Aug. 30, 2016    (CN) .......................... 2016 1 0765058

(51) Int. Cl.
*H04N 19/119*    (2014.01)
*H04N 19/162*    (2014.01)
(Continued)

(52) U.S. Cl.
CPC .......... *H04N 19/119* (2014.11); *G06T 3/0087* (2013.01); *G06T 3/4038* (2013.01);
(Continued)

(58) Field of Classification Search
CPC .. H04N 19/119; H04N 19/146; H04N 19/162; H04N 19/172; H04N 19/48; H04N 19/88; G06T 3/0087; G06T 3/4038
See application file for complete search history.

(56) References Cited

U.S. PATENT DOCUMENTS 6,331,869 B1    12/2001    Furlan et al.
6,934,420 B1    8/2005    Hsu et al.

FOREIGN PATENT DOCUMENTS

| CN | 105872546 A | * | 8/2016 |
| CN | 105872546 A |   | 8/2016 |

(Continued)

OTHER PUBLICATIONS

Y. Sánchez, R. Skupin and T. Schierl, "Compressed domain video processing for tile based panoramic streaming using HEVC," 2015 IEEE International Conference on Image Processing (ICIP), Quebec City, QC, 2015, pp. 2244-2248. (Year: 2015).*

(Continued)

*Primary Examiner* — Jamie J Atala
*Assistant Examiner* — Hesham K Abouzahra
(74) *Attorney, Agent, or Firm* — Cozen O'Connor

(57) ABSTRACT

Embodiments of the present application disclose a compression method and device of a panoramic video. The method comprises: for a target panoramic video, generating each frame picture of the target panoramic picture; for each frame picture respectively, compressing the frame picture; dividing the compressed frame picture; mosaicking the pictures obtained through the dividing; generating a new panoramic video according to all the pictures obtained through the mosaicking. With the embodiments of the present application, waste of network bandwidth can be reduced.

3 Claims, 3 Drawing Sheets

(51) Int. Cl.
| | |
|---|---|
| *H04N 19/172* | (2014.01) |
| *G06T 3/00* | (2006.01) |
| *G06T 3/40* | (2006.01) |
| *H04N 19/88* | (2014.01) |
| *H04N 19/48* | (2014.01) |
| *H04N 19/146* | (2014.01) |

(52) U.S. Cl.
 CPC ......... *H04N 19/146* (2014.11); *H04N 19/162* (2014.11); *H04N 19/172* (2014.11); *H04N 19/48* (2014.11); *H04N 19/88* (2014.11); *G06T 2200/32* (2013.01)

(56) References Cited

FOREIGN PATENT DOCUMENTS

| | | | |
|---|---|---|---|
| CN | 105898339 | A | 8/2016 |
| CN | 105898344 | A | 8/2016 |
| CN | 106162140 | A | 11/2016 |
| JP | 2012-60216 | A | 3/2012 |
| KR | 101242550 | B1 | 3/2013 |

OTHER PUBLICATIONS

Y. Sánchez, R. Skupin and T. Schierl, "Compressed domain video processing for tile based panoramic streaming using HEVC,"  2015 IEEE International Conference on Image Processing (ICIP), Quebec City, QC, 2015, pp. 2244-2248. (Year: 2015).*

Extended European Search Report for European Application No. 17845162.1, dated May 3, 2019, 9 pages.

Lin et al., "AHG8: Compact Cube Layout with Tile Partition," Joint Video Exploration Team (JVET) of ITU-TSG 16 WP 3 and ISO/IEC JTC 1?SC 29/WG 11, 4$^{th}$ Meeting, Chengdu, China, Oct. 15-21, 2016, 6 pages.

Ng et al., "Data Compression and Transmission Aspects of Panoramic Videos," *IEEE Transactions on Circuits and Systems for Video Technology*, 15(1):82-95, Jan. 2005.

Sánchez et al., "Compressed Domain Video Processing for Tile Based Panoramic Streaming Using HEVC," *IEEE International Conference on Image Processing (ICIP)*, Sep. 27, 2015, 5 pages.

International Search Report from PCT/CN0217/096432, dated Sep. 26, 2017, 2 pages.

* cited by examiner

PANORAMIC VIDEO COMPRESSION METHOD AND DEVICE

The present application claims priority to Chinese patent application No. 201610765058.4 filed with China Patent Office on Aug. 30, 2016 and entitled "PANORAMIC VIDEO COMPRESSION METHOD AND DEVICE", which is incorporated herein by reference in its entirety.

TECHNICAL FIELD

The present application relates to the field of video technology, and particularly to a compression method and device of a panoramic video.

BACKGROUND

A panoramic video refers to a 360-degree panoramic video, which evolves from the 360-degree panoramic technology. It converts a plurality of continuous static panoramic pictures into a dynamic video image. A panoramic video allows the viewing of a dynamic video from any degree around the shooting angle, whether it is left, right, up, or down. A panoramic video is no longer in the form of a single static panoramic picture, but a smooth and clear dynamic video image formed by stringing a plurality of panoramic pictures together.

Currently, the method for playing a panoramic video is that: a server sends the panoramic video to a client; then the client decodes the panoramic video into panoramic pictures, extracts from the panoramic pictures according to the current angle of a viewer, and plays a video composed of the extracted panoramic pictures. In this method, the process of extracting from the panoramic pictures according to the current angle of a viewer can be: extracting from the panoramic pictures according to the current angle of the viewer set and a spherical mapping relationship. A conventional spherical panoramic image is a rectangular image unwrapped in spherical texture coordinates of a sphere, but the actual available pixel range can be represented by an oval. The width at the widest point of the oval is the length of the rectangle and the width decreases from the widest point to both ends of the oval. Both ends are the shortest points, the width of which is one-pixel point-width. Therefore, there is redundant pixel information in the rectangular spherical panoramic image.

It can be seen that, in practical applications, the panoramic video seen by a user is only a part of the panoramic video sent by the server. However, the server will send the entire panoramic video to the client, resulting in the transmission of unnecessary data and thus resulting in a waste of network bandwidth.

SUMMARY OF THE INVENTION

The embodiments of the present application aim to provide a compression method and device of a panoramic video in order to reduce waste of network bandwidth.

In order to achieve the above objective, an embodiment of the present application discloses a compression method of a panoramic video, the method comprising:

for a target panoramic video, generating each frame picture of the target panoramic video;

for each frame picture respectively, compressing the frame picture;

dividing the compressed frame picture;

mosaicking the pictures obtained through the dividing;

generating a new panoramic video according to all the pictures obtained through the mosaicking.

Optionally, for each frame picture respectively, compressing the frame picture, comprises:

for each frame picture respectively, compressing the frame picture into a rhombic picture with an interpolation technology, wherein, the lengths of the two diagonals of the rhombic picture are equal to the width and the height of the frame picture respectively.

Optionally, dividing the compressed frame picture comprises:

equally dividing the rhombic picture into two triangular pictures, wherein the heights of both the two triangular pictures are half of the height of the frame picture or the heights of both the two triangular pictures are half of the width of the frame picture;

equally dividing one of the two triangular pictures into two right triangular pictures;

mosaicking the pictures obtained through the dividing comprises:

mosaicking the triangular picture of the two triangular pictures that is not equally divided and the two right triangular pictures into a rectangular picture.

Optionally, dividing the compressed frame picture comprises:

equally dividing the rhombic picture into two triangular pictures, wherein, the heights of both the two triangular pictures are half of the height of the frame picture or the heights of both the two triangular pictures are half of the width of the frame picture;

mosaicking the pictures obtained through the dividing comprises:

converting the two triangular pictures into two right triangular pictures that are of the same height and the same area as the two triangular pictures;

mosaicking the two right triangular pictures into a rectangular picture.

Optionally, prior to generating the new panoramic video according to all the pictures obtained through the mosaicking, the method further comprises:

presetting a mosaicked edge of the pictures obtained through the mosaicking.

In order to achieve the above object, an embodiment of the present application discloses a compression device of a panoramic video, the device comprising a processor, configured for executing a first generating module, a compressing module, a dividing module, a mosaicking module and a second generating module that are stored in a memory wherein, the first generating module for generating each frame picture of a target panoramic video for the target panoramic video;

the compressing module for compressing the frame picture respectively for the each frame picture;

the dividing module for dividing the compressed frame picture;

the mosaicking module for mosaicking the pictures obtained through the dividing;

the second generating module for generating a new panoramic video according to all the pictures obtained through the mosaicking.

Optionally, the compressing module is specifically for:

for each frame picture respectively, compressing the frame picture into a rhombic picture with an interpolation technology, wherein, the lengths of the two diagonals of the rhombic picture are equal to the width and the height of the frame picture respectively.

Optionally, the dividing module is specifically for:

equally dividing the rhombic picture into two triangular pictures, wherein, the heights of both the two triangular pictures are half of the height of the frame picture or the heights of both the two triangular pictures are half of the width of the frame picture;

equally dividing one of the two triangular pictures into two right triangular pictures;

the mosaicking module is specifically for:

mosaicking the triangular picture of the two triangular pictures that is not equally divided and the two right triangular pictures into a rectangular picture.

Optionally, the dividing module is specifically for:

equally dividing the rhombic picture into two triangular pictures, wherein, the heights of both the two triangular pictures are half of the height of the frame picture or the heights of both the two triangular pictures are half of the width of the frame picture;

Optionally, the mosaicking module is specifically for:

converting the two triangular pictures into two right triangular pictures that are of the same height and the same area as the two triangular pictures;

mosaicking the two right triangular pictures into a rectangular picture.

Optionally, prior to the second generating module, the device further comprises:

a processing module for presetting a mosaicked edge of the pictures obtained through the mosaicking.

In yet another aspect of an embodiment of the present application, an electronic equipment is provided, the electronic equipment comprising a processor, a communication interface, a memory and a communication bus, wherein, communication between the processor, the communication interface and the memory is achieved via the communication bus;

the memory is for storing a computer program;

the processor is for achieving a compression method of a panoramic video according to any one of the above embodiments when executing the computer program stored in the memory.

In another aspect, an embodiment of the present application provides a computer readable storage medium, wherein, the computer readable storage medium stores instructions that make a computer execute a compression method of a panoramic video according to any one of the above embodiments when being executed on the computer.

In yet another aspect of an embodiment of the present application, the embodiment of the present application further provides a computer program product comprising instructions that make a computer execute a compression method of a panoramic video according to any one of the above embodiments when being executed on the computer.

As can be seen from the above technical solution, a compression method and device of a panoramic video provided by the embodiments of the present application generates, for a target panoramic video, each frame picture of the target panoramic picture; for each frame picture respectively, compresses the frame picture; divides the compressed frame picture; mosaics the pictures obtained through the dividing; generates a new panoramic video according to all the pictures obtained through the mosaicking.

It can be seen that a panoramic video is compressed, the new, compressed panoramic video is sent to a client by a server, and subsequently, the client can play the entire panoramic video sent by the server, without transmitting unnecessary data in the embodiments of the application. Thus, waste of network bandwidth can be reduced.

Certainly, any product or method implementing the present application is not necessarily required to achieve all the above advantages at the same time.

BRIEF DESCRIPTION OF DRAWINGS

In order to describe the technical solutions in the embodiments of the present application or the prior art more clearly, the drawings to be used in the description of the embodiments or the prior art will be introduced briefly below.

DETAILED DESCRIPTION OF THE INVENTION

The technical solution in the embodiments of the present application will be described below in combination with the accompanied drawings in the embodiments of the present application.

First, a compression method of a panoramic video provided by an embodiment of the present application will be described below in detail.

Figure 1:
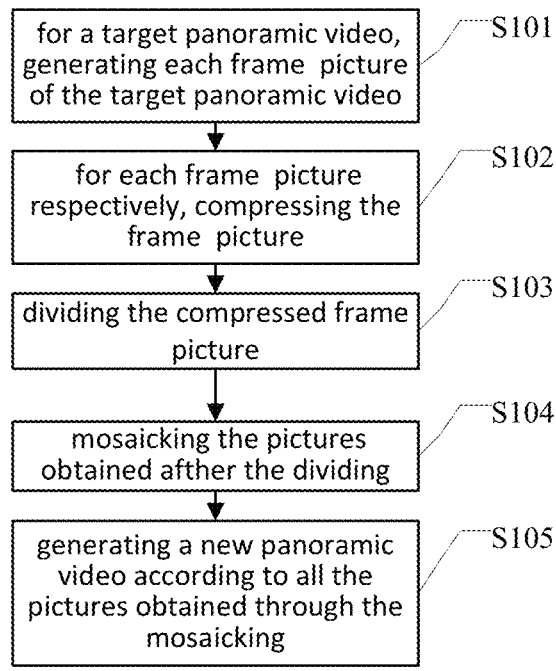
FIG. 1 is a schematic flow chart of a compression method of a panoramic video provided by an embodiment of the present application.

Reference is made to FIG. 1, which is a schematic flow chart of a compression method of a panoramic video provided by an embodiment of the present application. The method can comprise the following steps:

S101: for a target panoramic video, generating each frame picture of the target panoramic video;

in one implementation mode, the generated each frame picture of the target panoramic video can be a spherical panoramic image, i.e., it can be a rectangular picture unwrapped according to spherical texture coordinates, wherein, technologies such as video decoding can be employed to generate each frame picture of the target panoramic video for the target panoramic video.

In other words, each frame picture generated for the target panoramic video is a picture of rectangular shape.

S102: for each frame picture respectively, compressing the frame picture;

In one implementation mode, for each frame picture respectively, the frame picture can be compressed into a rhombic picture with an interpolation technology, wherein, the lengths of the two diagonals of the rhombic picture can be equal to the width and the height of the frame picture respectively.

In other words, in the embodiment of the present application: the above-mentioned frame picture is a rectangular picture unwrapped according to spherical texture coordinates, i.e. the picture before the compressing; the above-mentioned rhombic picture is a picture of rhombic shape, i.e. the picture after the compressing. It can be understood that, for each frame picture respectively, the frame picture is compressed into a rhombic picture with an interpolation technology, wherein, there is a corresponding relation between the frame picture and the rhombic picture, which can be that a frame picture corresponds to a rhombic picture. The lengths of the two diagonals of the rhombic picture can be equal to the width and the height of the corresponding frame picture respectively. In one implementation mode, when the width of the frame picture is the length of the short edge and the height of the frame picture is the length of the long edge, the shorter diagonal of the rhombic picture can be equal to the width of the corresponding frame picture, and the longer diagonal of the rhombic picture can be equal to the height of the corresponding frame picture.

Exemplarily, for each frame picture respectively, the original frame picture can be stretched and converted with an interpolation technology such as nearest neighbor interpolation technology, linear interpolation technology, cubic spline interpolation technology in order to compress this frame picture into a rhombic picture, wherein, the lengths of the two diagonals of the rhombic picture are equal to the width and the height of the frame picture respectively.

In other words, the above-mentioned original frame picture is the picture of rectangular shape, i.e. the picture before the compressing.

In one implementation mode, it is also possible to, for each frame picture, determine the compression ratio of the pixel number of each row of this frame picture. For example: the compression ratio of the middlemost row in the frame picture is 1:1 (which means that the pixel number of the middlemost row is not compressed); the compression ratio of the edge rows (i.e. the first row and the last row) of this frame picture is the number of pixel points in the rows: 1 (which means that the number of pixels of the edge rows of the image is compressed to 1); the number of pixel points in a row from the middlemost row to the first row or the last row other than the first and the last rows is compressed to (xy−2nx)/y, wherein, x is the number of pixel points in a row of this frame picture, y is the quantity of pixel points in a column of this frame picture (for example, if the size of this frame picture is 200*100, then x is 200 and y is 100), and n is the sequence number from the middlemost row to the first row or the last row; according to the determined compression ratio of each row, the number of pixel points of the row corresponding to the compression ratio is compressed, compressing the frame picture into a rhombic picture, wherein, the lengths of the two diagonals of the rhombic picture are equal to the width and the height of the frame picture respectively.

For example, for a frame picture, the number of pixel points in each row of this frame picture x is 20, and the number of pixel points in each column y is 21, i.e. this frame picture has 21 rows of pixel points, and the 11th row is the middlemost row of this frame picture.

In one case, starting with the sequence number of the middlemost row being 0, the sequence numbers of the middlemost row (the 11th row) to the first row (the 1st row) can be 0~10, i.e. the values of n from the middlemost row (the 11th row) to the first row (the 1st row) are 0~10 respectively; the sequence numbers of the middlemost row (the 11th row) to the last row (the 21st row) can be 0~10, i.e. the values of n from the middlemost row (the 11th row) to the last row (the 21st row) are 0~10 respectively; subsequently, the numbers of pixel points corresponding to the 10th row to the 1st row and the 12th row to the 21st row are calculated using the above-mentioned formula "(xy−2nx)/y" respectively. Take the 10th row as an example: the value of n corresponding to the 10th row is 1; here, there is (20*21−2*1*20)/21; i.e. the number of pixel points corresponding to the 10th row is 380/21, which can be 18.

S103: dividing the compressed frame picture;

Specifically, in practical applications, the rhombic picture can be equally divided into two top and bottom (or left and right) triangular pictures, wherein, the heights of both the two triangular pictures are half of the height of the frame picture or the heights of both the two triangular pictures are half of the width of the frame picture; one of the two triangular pictures is equally divided into two right triangular pictures.

Specifically, in practical applications, the rhombic picture can be equally divided into two top and bottom (or left and right) triangular pictures, wherein, the heights of both the two triangular pictures are half of the height of the frame picture or the heights of both the two triangular pictures are half of the width of the frame picture.

Exemplarily, for each frame picture respectively, the rhombic picture can be equally divided into two triangular pictures with one of the diagonals of the rhombic picture (for example, the one whose length is the width of the corresponding frame picture) as the dividing boundary, wherein, the heights of both the two triangular pictures are half of the height of the corresponding frame picture; further, either one of the two triangular pictures can be equally divided into two right triangular pictures, or may not be equally divided. In practical applications, the rhombic picture can also be equally divided into two triangular pictures with the other diagonal of the rhombic picture (for example, the one whose length is the height of the corresponding frame picture) as the dividing boundary, wherein, the heights of both the two triangular pictures are half of the height of the corresponding frame picture; further, either one of the two triangular pictures can be equally divided into two right triangular pictures, or may not be equally divided.

In other words, in one case, for each frame picture respectively, the rhombic picture can be equally divided into two triangular pictures with one of the diagonals of the rhombic picture (for example, the one whose length is the width of the corresponding frame picture) as the dividing boundary, wherein, when the diagonal used as the dividing boundary is the one whose length is the width of the corresponding frame picture, the heights of both the two triangular pictures obtained after the dividing are half of the height of the corresponding frame picture; further, either one of the two triangular pictures obtained after the dividing can be equally divided into two right triangular pictures in order to execute the subsequent flow process of compressing the panoramic video.

Figure 7A:
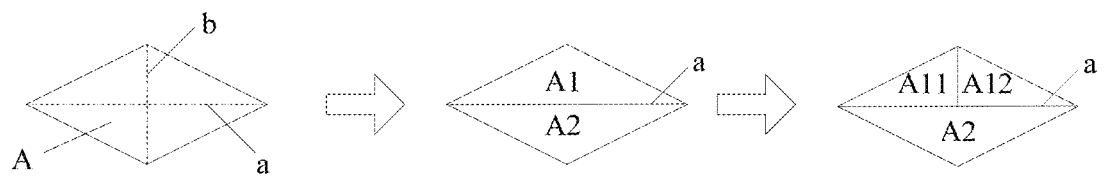
FIG. 7A is a schematic view of the dividing of a rhombic picture.

For example, as shown in FIG. 7A, there are two diagonals a and b of the rhombic picture A. With the diagonal a as the dividing boundary, the rhombic picture A is divided into two congruent triangular pictures. The two triangular pictures obtained after the dividing are a triangular picture A1 and a triangular picture A2 respectively. It can be understood that both the triangular picture A1 and the triangular picture A2 are isosceles triangles. Further, the triangular picture A1 is equally divided into two right triangular pictures A11 and A12. It can be understood that the triangular picture A1 can be equally divided into the two right triangular pictures A11 and A12 with the median of the base of the triangular picture A1 as the dividing boundary. Wherein the term "congruent" used in the present embodiment is only related to the shape of the triangular pictures.

In another case, the rhombic picture can be equally divided into two triangular pictures with the other diagonal of the rhombic picture (for example, the one whose length is the height of the corresponding frame picture) as the dividing boundary, wherein, when the diagonal used as the dividing boundary is the one whose length is the height of the corresponding frame picture, the heights of both the two triangular pictures obtained after the dividing are half of the height of the corresponding frame picture; further, either one of the two triangular pictures obtained after the dividing can be equally divided into two right triangular pictures in order to execute the subsequent flow process of compressing the panoramic video.

Figure 7B:
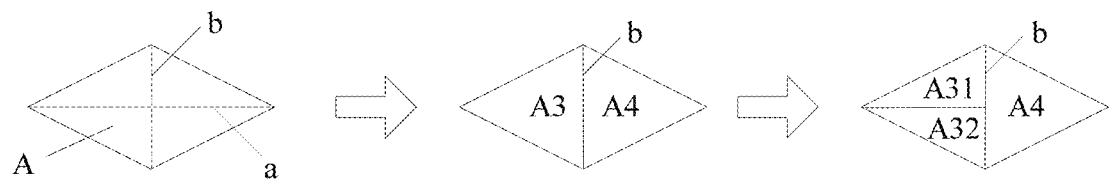
FIG. 7B is another schematic view of the dividing of a rhombic picture.

Following the above example, as shown in FIG. 7B, there are two diagonals a and b of the rhombic picture A. Here, with the diagonal b as the dividing boundary, the rhombic picture A is divided into two congruent triangular pictures. The two triangular pictures obtained after the dividing are a triangular picture A3 and a triangular picture A4 respectively. It can be understood that both the triangular picture A3 and the triangular picture A4 are isosceles triangles. Further, the triangular picture A3 is equally divided into two right triangular pictures A31 and A32. It can be understood that the triangular picture A3 can be equally divided into the two right triangular pictures A31 and A32 with the median of the base of the triangular picture A3 as the dividing boundary. Wherein the term "congruent" used in the present embodiment is only related to the shape of the triangular pictures.

Certainly, it is also possible to not equally divide either one of the above-mentioned two triangular pictures obtained after the dividing, which will be described further below for clear layout.

S104: mosaicking the pictures obtained after the dividing;

Specifically, in practical applications, the triangular picture of the two triangular pictures that is not equally divided and the two right triangular pictures can be mosaicked into a rectangular picture.

In an implementation mode, two congruent triangles can be obtained after dividing the rhombic picture once. In one case, one of the two obtained congruent triangles can be further divided once again in order to obtain two congruent right triangles. Further, the triangle obtained above that is not divided once again and the two congruent right triangles obtained after the further dividing can be mosaicked into a rectangular picture. Wherein the term "congruent" used in the present embodiment is only related to the shape of the triangular pictures.

Exemplarily, in the case that one of the two triangular pictures is equally divided into two right triangular pictures, the two right triangular pictures can be translated to, respectively, the left and right sides (or the upper and lower sides, specifically based on achieving mosaicking into a rectangular picture) of the triangular picture of the above-mentioned two triangular pictures that is not equally divided, thereby mosaicking the triangular picture of the above-mentioned two triangular pictures that is not equally divided and the two right triangular pictures into a rectangular picture, such that the width of the rectangular picture is that of the original picture and the height of the rectangular picture is half of that of the original picture, or such that the height of the rectangular picture is that of the original picture and the width of the rectangular picture is half of that of the original picture, thereby reducing the size of the mosaicked rectangular picture to half of that of the original picture.

In other words, both the above terms "original picture(s)" and "original rectangular picture(s)" can represent the frame picture mentioned in the embodiments of the present application, i.e. the picture before the compressing.

Specifically, in one implementation mode, the two triangular pictures can be converted into two right triangular pictures that are of the same height and the same area as the two triangular pictures respectively; the two right triangular pictures are mosaicked into a rectangular picture.

Exemplarily, in the case that none of the two triangular pictures is equally divided into two right triangular pictures, the above-mentioned two triangular pictures can be converted respectively with an image conversion technology to obtain two right triangular pictures that are of the same height and the same area as the two triangular pictures; the obtained two right triangular pictures are mosaicked into a rectangular picture, such that the width of the mosaicked rectangular picture is that of the original picture and the height of the mosaicked picture is half of that of the original picture, or such that the height of the mosaicked rectangular picture is that of the original picture and the width of the mosaicked picture is half of that of the original picture, thereby reducing the size of the mosaicked rectangular picture to half of that of the original picture.

In other words, both the above "original picture(s)" and "original rectangular picture(s)" can represent the frame picture mentioned in the embodiments of the present application, i.e. the picture before the compressing.

Figure 5:
FIG. 5 is a schematic view of the generation of a mosaicked rectangular picture provided by an embodiment of the present application.

Exemplarily, as shown in FIG. 5, FIG. 5 is a schematic view of the generation of a mosaicked rectangular picture provided by an embodiment of the present application. In one implementation mode, as shown in FIG. 5, the original rectangular picture can be equally divided into two top and bottom rectangular pictures M and N, the rectangular picture M is stretched and compressed into a triangle A; the rectangular picture N is stretched and compressed into a triangle that has the same base and equal height as the triangle A and is symmetric with the triangle A, and the triangle obtained through compressing the rectangular picture N is equally divided into a right triangle B and a right triangle C; the triangle B is translated and copied to the right side of the triangle A to obtain a triangle $B_1$ and the triangle C is translated and copied to the left side of the triangle A to obtain a triangle $C_1$; the triangle A, the triangle $B_1$ and the triangle $C_1$ are mosaicked into a rectangular picture, and the size of the mosaicked rectangular picture is reduced to half of that of the original rectangular picture.

Figure 6:
FIG. 6 is a schematic view of the generation of another mosaicked rectangular picture provided by an embodiment of the present application.

Exemplarily, as shown in FIG. 6, FIG. 6 is a schematic view of the generation of another mosaicked rectangular picture provided by an embodiment of the present application. In one implementation mode, as shown in FIG. 6, it is also possible to equally divide the original rectangular picture into two top and bottom rectangular pictures M and N, the rectangular picture M (which is the same as the above-mentioned rectangular picture M) is stretched and compressed into a triangle A (which is the same as the above-mentioned triangle A); the rectangular picture N (which is the same as the above-mentioned rectangular picture N) is stretched and compressed into a triangle E that has the same base and equal height as the triangle A and is symmetric with the triangle A; the triangle A is converted in the horizontal direction to obtain a right triangle $A_1$; the triangle E is converted in the horizontal direction to obtain a right triangle $E_1$; the right triangle $A_1$ and the right triangle $E_1$ are mosaicked into a rectangular picture, and the size of the mosaicked rectangular picture is reduced to half of that of the original rectangular picture.

S105: generating a new panoramic video according to all the pictures obtained through the mosaicking.

Specifically, according to all the rectangular pictures obtained through the mosaicking, a new, compressed panoramic video can be generated with a technology in the prior art such as encoding all the rectangular pictures, which is not described herein in the embodiments of the present application.

In other words, each frame picture corresponds to a rectangular picture obtained through the mosaicking. A new, compressed panoramic video can be generated by encoding all the rectangular pictures obtained through the mosaicking with current encoding technologies.

Specifically, in one implementation mode, the rectangular picture obtained through the mosaicking can be referred to as a diamond panoramic image. During the process of playing the new, compressed panoramic video, the diamond panoramic image can be converted inversely according to the inverse process of generating the diamond panoramic image, to obtain a spherical panoramic image; the spherical panoramic image can be rendered with pixel inverse sampling technology of Open Graphics Library (OpenGL for short) shader or triangular patch texture drawing technology of Open Graphics Library, to render a panoramic image from the spherical panoramic image.

With respect to the process of inversely converting the diamond panoramic image according to the inverse process of generating the diamond panoramic image to obtain a spherical panoramic image, in one implementation mode, it can be: first obtaining a new, compressed panoramic video and decoding the new, compressed panoramic video to obtain each diamond panoramic image corresponding to the new, compressed panoramic video; for each diamond panoramic image, dividing and translating each diamond panoramic image to obtain a rhombic picture corresponding to each diamond panoramic image; then converting and stretching (for example, stretching horizontally) each rhombic picture with an interpolation technology to obtain a spherical panoramic image corresponding to each diamond panoramic image, and then, the spherical panoramic image can be rendered with pixel inverse sampling technology of Open Graphics Library shader or triangular patch texture drawing technology of Open Graphics Library shader, to render a panoramic image from the spherical panoramic image.

Wherein, the process of dividing and translating each diamond panoramic image to obtain the rhombic picture corresponding to each diamond panoramic image can be: for each diamond panoramic image, dividing the diamond panoramic image to obtain three triangular pictures, one lager triangular picture (which is a isosceles triangular picture) and two smaller congruent triangular pictures (which are two right triangular pictures), wherein, the area of the above-mentioned larger triangular picture is equal to the sum of the areas of the above-mentioned two smaller congruent triangular pictures; mosaicking the obtained three triangular pictures described above to obtain a rhombic picture corresponding to the diamond panoramic image. It can also be: for each diamond panoramic image, dividing the diamond panoramic image to obtain two congruent right triangular pictures; converting the two congruent right triangular pictures to obtain two congruent isosceles triangular pictures that are of the same height and the same area as the two congruent right triangular pictures with an image conversion technology, and then mosaicking the obtained two congruent isosceles triangular pictures to obtain a rhombic picture corresponding to the diamond panoramic image.

Or, with respect to the process of inversely converting the diamond panoramic image according to the inverse process of generating the diamond panoramic image to obtain a spherical panoramic image, in another implementation mode, it can be: first obtaining a new, compressed panoramic video and decoding the new, compressed panoramic video to obtain each diamond panoramic image corresponding to the new, compressed panoramic video; converting and stretching each diamond panoramic image with an interpolation technology to obtain a converted and stretched picture; dividing and translating each converted and stretched picture to obtain a spherical panoramic image corresponding to each diamond panoramic image; then the spherical panoramic image can be rendered with pixel inverse sampling technology of Open Graphics Library shader or triangular patch texture drawing technology of Open Graphics Library shader, to render a panoramic image from the spherical panoramic image.

Specifically, in one implementation mode, corresponding texture coordinates of diamond panoramic images can also be calculated using texture coordinates of spherical panoramic images corresponding to the display viewpoint of a panoramic video player with pixel inverse sampling technology of OpenGL shader (Open Graphics Library shader), so that a panoramic image can be rendered from the diamond panoramic image directly without inversely converting the diamond panoramic image according to the inverse process of generating the diamond panoramic image and without obtaining a spherical panoramic image.

In other words, in one implementation mode, corresponding texture coordinates of diamond panoramic images can also be calculated using texture coordinates of spherical panoramic images corresponding to the display viewpoint of a panoramic video player with pixel inverse sampling technology of OpenGL shader (Open Graphics Library shader), and further, the correspondence between the texture coordinates of diamond panoramic images and the texture coordinates of spherical panoramic images corresponding to the display viewpoint of the panoramic video player is obtained, and using this correspondence, the diamond panoramic image based texture coordinates of each pixel point in the diamond panoramic image is converted into spherical panoramic image based texture coordinates, to obtain the spherical panoramic image corresponding to each diamond panoramic image.

It can be seen that a panoramic video is compressed, the new, compressed panoramic video is sent to a client by a sever, and subsequently, the client can play the entire panoramic video sent by the server, without transmitting unnecessary data, thus reducing waste of network bandwidth.

In the embodiments of the present invention, the resolution of the panoramic video can be maintained while compressing the panoramic video, so that a client can obtain and play a resolution-lossless panoramic video after having obtained the panoramic video sent by a server and decoded the obtained panoramic video.

Figure 2:
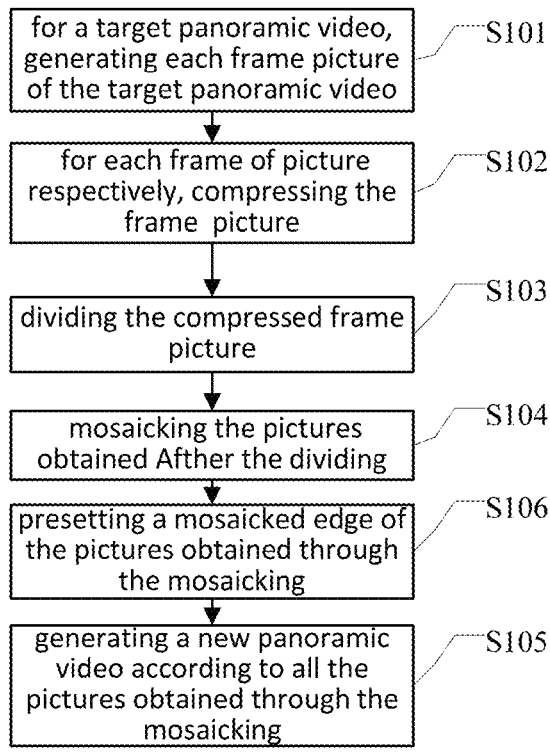
FIG. 2 is a schematic flow chart of another compression method of a panoramic video provided by an embodiment of the present application.

Referring to FIG. 2, FIG. 2 is a schematic flow chart of another compression method of panoramic video provided by an embodiment of the present application. The embodiment shown in FIG. 2 adds S106 to the embodiment shown in FIG. 1: presetting a mosaicked edge of the pictures obtained through the mosaicking.

In other words, the above-mentioned S106 can be added between S104 and S105. The above-mentioned presetting can be understood as an operation of repeatedly drawing the pixels at the mosaicking boundary in the picture obtained through the dividing.

In one implementation mode, when rendering the diamond panoramic image obtained through the mosaicking, in order to prevent pixels at the boundaries of adjacent triangles from crossing the boundaries, resulting in the appearance of mosaicking seams, during sub-linear interpolation of the operation of inverse sampling, a mosaicked edge of the picture obtained through the mosaicking can be processed, i.e. the pixels at the mosaicked boundaries of the picture obtained through the dividing can be drawn repeatedly. Specifically, 1 or 2 or 3 pixels can be drawn repeatedly at the boundary point of each triangular horizontal scan segment, the pixels having the same color as that of adjacent pixels of the triangle to which they belong, thereby forming an edge of repeated pixels for isolation. Specifically, in practical applications, the formed edge can be a double-boundary edge, or a single-boundary edge. Wherein, a double-boundary is a boundary with two colors, and a single-boundary is a boundary with a single color.

The above-mentioned single-boundary can be understood as the boundary that is formed through repeatedly drawing the pixels at a boundary of one of triangles of the mosaicked edge, and the above double-boundary can be understood as the boundary that is formed through repeatedly drawing the pixels at boundaries of two triangles of the same mosaicked edge.

It can be seen that a panoramic video is compressed, the new, compressed panoramic video is sent to a client by a server, and subsequently, the client can play the entire panoramic video sent by the server, without transmitting unnecessary data, thus reducing waste of network bandwidth. In addition, repeatedly drawing the pixels at the mosaicking boundaries in the picture obtained through the dividing prevents the pixels at the boundaries from crossing the boundaries, resulting in the appearance of mosaicking seams.

Figure 3:
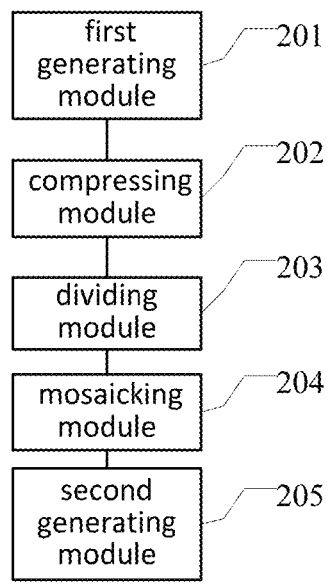
FIG. 3 is a schematic structural view of a compression device of a panoramic video provided by an embodiment of the present application.

Referring to FIG. 3, FIG. 3 is a schematic structural view of a compression device of a panoramic video provided by an embodiment of the present application. Corresponding to the flow process shown in FIG. 1, the compression device can comprise a processor configured for executing a first generating module 201, a compressing module 202, a dividing module 203, a mosaicking module 204 and a second generating module 205 that are stored in a memory.

The first generating module 201 is for generating each frame picture of a target panoramic video for the target panoramic video;

the compressing module 202 is for compressing each frame picture respectively for the frame picture.

Specifically, the compressing module 202 can be specifically for:

for each frame picture respectively, compressing the frame picture into a rhombic picture with an interpolation technology, wherein, the lengths of two diagonals of the rhombic picture are equal to the width and the height of the frame picture respectively.

The dividing module 203 is for dividing the compressed frame picture;

the mosaicking module 204 is for mosaicking the picture obtained through the dividing;

specifically, the dividing module 203 can be specifically for: equally dividing the rhombic picture into two triangular pictures, wherein, the heights of both the two triangular pictures are half of the height of the frame picture or the heights of both the two triangular pictures are half of the width of the frame picture; equally dividing one of the two triangular pictures into two right triangular pictures. The mosaicking module 204 can be specifically for: mosaicking the triangular picture of the two triangular pictures that is not equally divided and the two right triangular pictures into a rectangular picture.

Specifically, the dividing module 203 can be specifically for: equally dividing the rhombic picture into two triangular pictures, wherein, both the heights of the two triangular pictures are half of the height of the frame picture or the heights of both the two triangular pictures are half of the width of the frame picture. The mosaicking module 204 can be specifically for: converting the two triangular pictures into two right triangular pictures that are of the same height and the same area as the two triangular pictures respectively; mosaicking the two right triangular pictures into a rectangular picture.

The second generating module 205 is for generating a new panoramic video according to all the pictures obtained through the mosaicking.

It can be seen that a panoramic video is compressed, the new, compressed panoramic video is sent to a client by a server, and subsequently, the client can play the entire panoramic video sent by the server, without transmitting unnecessary data, thus reducing waste of network bandwidth.

Figure 4:
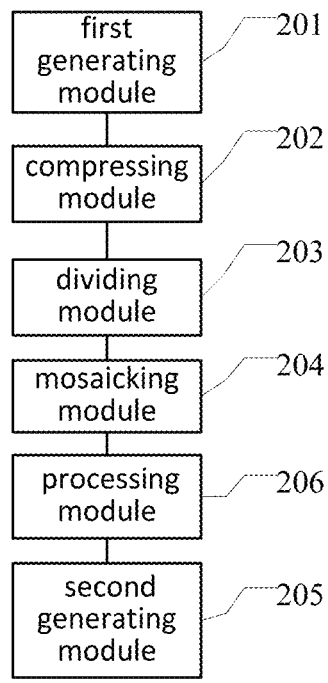
FIG. 4 is a schematic structural view of another compression device of a panoramic video provided by an embodiment of the present application.

Referring to FIG. 4, FIG. 4 is a schematic structural view of another compression device of a panoramic video provided by an embodiment of the present application. The embodiment shown in FIG. 4 of the present application adds to the embodiment shown in FIG. 3 a processing module 206 for presetting the mosaicked edge of the picture obtained through the mosaicking.

It can be seen that a panoramic video is compressed, the new, compressed panoramic video is sent to a client by a server, and subsequently, the client can play the entire panoramic video sent by the server, without transmitting unnecessary data, thus reducing waste of network bandwidth. In addition, repeatedly drawing the pixels at the mosaicking boundaries in the picture obtained through the dividing prevents the pixels at the boundaries from crossing the boundaries, resulting in the appearance of mosaicking seams.

Figure 8:
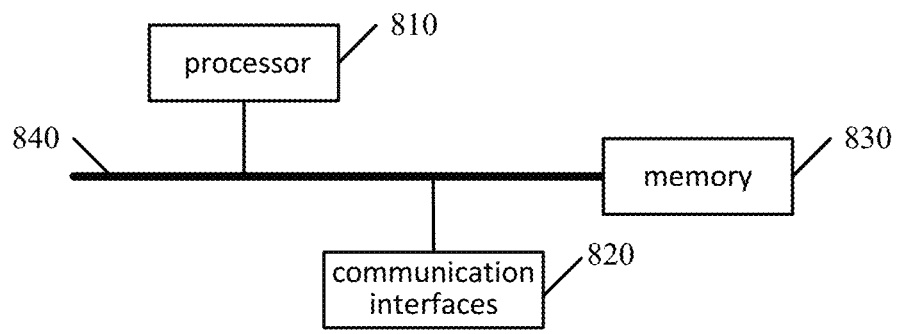
FIG. 8 is a schematic structural view of an electronic equipment provided by an embodiment of the present application.

An embodiment of the present application further provides an electronic equipment, as shown in FIG. 8, which can comprise a processor 810, a communication interface 820, a memory 830 and a communication bus 840, wherein, mutual communication between the processor 810, the communication interfaces 820 and the memory 830 is achieved via the communication bus;

the memory 830 is for storing a computer program;

the processor 810 is for implementing a compression method of a panoramic video provided by the embodiments of the present application when executing the computer program stored in the memory, wherein, the compression method of a panoramic video can comprise the following steps:

for a target panoramic video, generating each frame picture of the target panoramic video;

for each frame picture respectively, compressing the frame picture;

dividing the compressed frame picture;

mosaicking the pictures obtained through the dividing;

generating a new panoramic video according to all the pictures obtained through the mosaicking.

By implementing the embodiment of the present application, the processor of the electronic equipment runs the computer program stored in the memory to execute the compression method of a panoramic video provided by the embodiments of the present application, and thus can achieve that a panoramic video is compressed, the new, compressed panoramic video is sent to a client by a server, and subsequently, the client can play the entire panoramic video sent by the server, without transmitting unnecessary data, thus reducing waste of network bandwidth.

Optionally, during the execution of the process of achieving for each frame picture, the compressing of the frame picture, the electronic equipment is specifically for:

for each frame picture respectively, compressing the frame picture into a rhombic picture with an interpolation technology, wherein, the lengths of the two diagonals of the rhombic picture are equal to the width and the height of the frame picture respectively.

Optionally, during the execution of the process of achieving the dividing of the compressed frame picture, the electronic equipment is specifically for:

equally dividing the rhombic picture into two triangular pictures, wherein, the heights of both the two triangular pictures are half of the height of the frame picture or the heights of both the two triangular pictures are half of the width of the frame picture;

during the execution of the process of achieving mosaicking the picture obtained through the dividing, the electronic equipment is specifically for:

mosaicking the triangular picture of the two triangular pictures that is not equally divided and the two right triangular pictures into a rectangular picture.

Optionally, during the execution of the process of achieving the dividing of the compressed frame picture, the electronic equipment is specifically for:

equally dividing the rhombic picture into two triangular pictures, wherein, the heights of both the two triangular pictures are half of the height of the frame picture or the heights of both the two triangular pictures are half of the width of the frame picture;

during the execution of the process of achieving mosaicking the picture obtained through the dividing, the electronic equipment is specifically for:

converting the two triangular pictures into two right triangular pictures that are of the same height and the same area as the two triangular pictures;

mosaicking the two right triangular pictures into a rectangular picture.

Optionally, prior to executing the process of generating a new panoramic video according all the pictures obtained through the mosaicking, the electronic equipment is further for:

presetting a mosaicked edge of pictures obtained through the mosaicking.

The communication bus mentioned in the above-mentioned electronic equipment can be a Peripheral Component Interconnect (PCI) bus, or an Extended Industry Standard Architecture (EISA) bus and so on. The communication bus can be divided into address bus, data bus, control bus and so on. For ease of representation, the communication bus is represented only by a thick line in the figures, but it does not mean that there is only one bus or one type of bus.

The communication interface is for communication between the above-mentioned electronic equipment and other devices.

The memory can comprise a Random Access Memory (RAM), or a Non-Volatile Memory (NVM), such as at least one disk memory. Optionally, the memory can be at least one storage device located away from the above-mentioned processor.

The above-mentioned processor can be a general processor, including a central processing unit (CPU), a network processor (NP) etc.; or a digital signal processor (Digital Signal Processing, DSP), an application specific integrated circuit (ASIC), a field-programmable gate array (FPGA), or other programmable logic device, a discrete gate or a transistor logic device, a discrete hardware component.

In yet another embodiment provided by the present application, it is further provided a computer readable storage medium, wherein, the computer readable storage medium stores instructions that make a computer execute a compression method of a panoramic video according to any of the above embodiments when being executed on the computer, wherein, the compression method of a panoramic video can comprise the following steps:

for a target panoramic video, generating each frame picture of the target panoramic video;

for each frame picture respectively, compressing the frame picture;

dividing the compressed frame picture;

mosaicking the pictures obtained through the dividing;

generating a new panoramic video according to all the pictures obtained through the mosaicking.

By implementing the embodiment of the present application, the computer readable storage medium stores instructions that make the computer execute the compression method of a panoramic video provided by the embodiments of the present application, and thus can achieve that a panoramic video is compressed, the new, compressed panoramic video is sent to a client by a server, and subsequently, the client can play the entire panoramic video sent by the server, without transmitting unnecessary data, thus reducing waste of network bandwidth.

Optionally, the compressing of the frame picture for each frame picture comprises:

for each frame picture respectively, compressing the frame picture into a rhombic picture with an interpolation technology, wherein, the lengths of the two diagonals of the rhombic picture are equal to the width and the height of the frame picture respectively.

Optionally, dividing the compressed frame picture comprises:

equally dividing the rhombic picture into two triangular pictures, wherein, the heights of both the two triangular pictures are half of the height of the frame picture or the heights of both the two triangular pictures are half of the width of the frame picture;

equally dividing one of the two triangular pictures into two right triangular pictures;

the mosaicking of the pictures obtained through the dividing comprises:

mosaicking the triangular picture of the two triangular pictures that is not equally divided and the two right triangular pictures into a rectangular picture.

Optionally, the dividing of the compressed frame picture comprises:

equally dividing the rhombic picture into two triangular pictures, wherein, the heights of both the two triangular pictures are half of the height of the frame picture or the heights of both the two triangular pictures are half of the width of the frame picture;

the mosaicking of the pictures obtained through the dividing comprises:

converting the two triangular pictures into two right triangular pictures that are of the same height and the same area as the two triangular pictures;

mosaicking the two right triangular pictures into a rectangular picture.

Optionally, prior to generating a new panoramic video according to all the pictures obtained through the mosaicking, the method further comprises:

presetting a mosaicked edge of the pictures obtained through the mosaicking.

In yet another embodiment provided by the present application, it is further provided a computer program product comprising instructions, the computer program product making a computer execute a compression method of panoramic video according to any of the above embodiments when being executed on the computer, wherein, the compression method of a panoramic video can comprise the following steps:

for a target panoramic video, generating each frame picture of the target panoramic video;

for each frame picture respectively, compressing the frame picture;

dividing the compressed frame picture;

mosaicking the pictures obtained through the dividing;

generating a new panoramic video according to all the pictures obtained through the mosaicking.

By implementing the embodiment of the application, the computer program product comprising instructions makes the computer execute the compression method of panoramic video provided by the embodiments of the present application when being executed in the computer, and thus can achieve that a panoramic video is compressed, the new, compressed panoramic video is sent to a client by a server, and subsequently, the client can play the entire panoramic video sent by the server, without transmitting unnecessary data, thus reducing waste of network bandwidth.

Optionally, the compressing of the frame picture for each frame picture comprises:

for each frame picture respectively, compressing the frame picture into a rhombic picture with an interpolation technology, wherein, the lengths of the two diagonals of the rhombic picture are equal to the width and the height of the frame picture respectively.

Optionally, dividing the compressed frame picture comprises:

equally dividing the rhombic picture into two triangular pictures, wherein, the heights of both the two triangular pictures are half of the height of the frame picture or the heights of both the two triangular pictures are half of the width of the frame picture;

equally dividing one of the two triangular pictures into two right triangular pictures;

the mosaicking of the pictures obtained through the dividing comprises:

mosaicking the triangular picture of the two triangular pictures that is not equally divided and the two right triangular pictures into a rectangular picture.

Optionally, the dividing of the compressed frame picture comprises:

equally dividing the rhombic picture into two triangular pictures, wherein the heights of both the two triangular pictures are half of the height of the frame picture or the heights of both the two triangular pictures are half of the width of the frame picture;

the mosaicking of the pictures obtained through dividing comprises:

converting the two triangular pictures into two right triangular pictures that are of the same height and the same area as the two triangular pictures;

mosaicking the two right triangular pictures into a rectangular picture.

Optionally, prior to generating a new panoramic video according to all the pictures obtained through the mosaicking, the method further comprises:

presetting a mosaicked edge of the pictures obtained through the mosaicking.

The above embodiments can be implemented in whole or in part through software, hardware, firmware or any combination thereof. When it is implemented through software, it can be implemented in whole or in part in the form of a computer program product. The computer program product comprises one or more computer instructions. When the computer program instructions are loaded and executed in a computer, all or part of the flow processes or functions described according to the embodiments of the present application are generated. The computer can be a general computer, a dedicated computer, a computer network or other programmable device. The computer instructions can be stored in a computer readable storage medium or can be transmitted from a computer readable storage medium to another computer readable storage medium. For example, the computer instructions can be transmitted from a website, computer, server or data center to another website, computer, server or data center in a wired way (for example coaxial cable, optical fiber, digital subscriber line (DSL)) or a wireless way (for example infrared, wireless, microwave and so on). The computer readable storage medium can be any available medium that can be accessed by a computer, or a data storage device such as a server, a data center that integrates one or more available medium. The available medium can be a magnetic medium (for example: floppy disk, hard disk, magnetic tape), an optical medium (for example: DVD) or a semiconductor medium (for example: Solid State Disk (SSD)) and so on.

It should be noted that relationship terms herein such as "first," "second" and the like are only used to distinguish one object or operation from another object or operation, and do not necessarily require or imply that there is any such actual relationship or sequence between these objects or operations. Moreover, the terms "comprise," "include" or any variants thereof are intended to cover non-exclusive inclusion, so that processes, methods, articles or devices comprising a series of elements include not only those elements, but also other elements not expressly listed or elements intrinsic to those processes, methods, articles, or devices. Unless further limited, elements limited by the statement "comprise(s) a/an . . . " do not exclude that there are additional identical elements in the processes, methods, articles, or devices that include the elements.

All embodiments in the present description are described in a correlated manner, and identical or similar parts in various embodiments can be referred to one another, the description for each embodiment all focuses on the differences with other embodiments. In particular, the device embodiments are described in a concise manner and one can refer to the part of the description of the method embodiments regarding what is related, since the device embodiments are substantially similar to the method embodiments.

The invention claimed is:

1. A compression method of a panoramic video, wherein, the panoramic video is a dynamic video that allows to be viewed from any degree around the shooting angle, the method comprises:
   for a target panoramic video, generating each frame of picture of the target panoramic video;
   for each frame of picture respectively, compressing the frame of picture into a rhombic picture by means of stretching and converting with an interpolation technology, wherein, the lengths of the two diagonals of the rhombic picture are equal to the width and the height of the frame of picture respectively;
   equally dividing the rhombic picture into two triangular pictures, and equally dividing one of the two triangular pictures into two right triangular pictures, wherein, the heights of both the two triangular pictures are half of the height of the frame of picture or the heights of both the two triangular pictures are half of the width of the frame of picture;
   mosaicking pictures obtained through the dividing, which comprises mosaicking the triangular picture of the two triangular pictures which is not equally divided and the two right triangular pictures into a rectangular picture;
   presetting a mosaicked edge for the pictures obtained through the mosaicking by means of repeatedly drawing 1 or 2 or 3 pixels having the same color as that of adjacent pixels of the triangle to which they belong, at the boundary point of each triangular horizontal scan segment to form an edge of repeated pixels;
   generating a new panoramic video based on the pictures with the mosaicked edge.

2. An electronic equipment, wherein, the electronic equipment comprises at least one processor, and a memory;
   the memory is for storing a computer program;
   the processor is for achieving a compression method of a panoramic video-when executing the computer program stored in the memory; wherein, the compression method of a panoramic video comprises:
   for a target panoramic video, generating each frame of picture of the target panoramic video;
   for each frame of picture respectively, compressing the frame of picture into a rhombic picture by means of stretching and converting with an interpolation technology, wherein, the lengths of the two diagonals of the rhombic picture are equal to the width and the height of the frame of picture respectively;
   equally dividing the rhombic picture into two triangular pictures, and equally dividing one of the two triangular pictures into two right triangular pictures, wherein, the heights of both the two triangular pictures are half of the height of the frame of picture or the heights of both the two triangular pictures are half of the width of the frame of picture;
   mosaicking pictures obtained through the dividing, which comprises mosaicking the triangular picture of the two triangular pictures which is not equally divided and the two right triangular pictures into a rectangular picture;
   presetting a mosaicked edge for the pictures obtained through the mosaicking by means of repeatedly drawing 1 or 2 or 3 pixels having the same color as that of adjacent pixels of the triangle to which they belong, at the boundary point of each triangular horizontal scan segment to form an edge of repeated pixels;
   generating a new panoramic video based on the pictures with the mosaicked edge.

3. A non-transitory computer readable storage medium, wherein, the computer readable storage medium stores instructions that make a computer execute a compression method of a panoramic video when being executed in the computer; wherein, the compression method of a panoramic video comprises:
   for a target panoramic video, generating each frame of picture of the target panoramic video;
   for each frame of picture respectively, compressing the frame of picture into a rhombic picture by means of stretching and converting with an interpolation technology, wherein, the lengths of the two diagonals of the rhombic picture are equal to the width and the height of the frame of picture respectively;
   equally dividing the rhombic picture into two triangular pictures, and equally dividing one of the two triangular pictures into two right triangular pictures, wherein, the heights of both the two triangular pictures are half of the height of the frame of picture or the heights of both the two triangular pictures are half of the width of the frame of picture;
   mosaicking pictures obtained through the dividing, which comprises mosaicking the triangular picture of the two triangular pictures which is not equally divided and the two right triangular pictures into a rectangular picture;
   presetting a mosaicked edge for the pictures obtained through the mosaicking by means of repeatedly drawing 1 or 2 or 3 pixels having the same color as that of adjacent pixels of the triangle to which they belong, at the boundary point of each triangular horizontal scan segment to form an edge of repeated pixels;
   generating a new panoramic video based on the pictures with the mosaicked edge.

* * * * *